(12) United States Patent  (10) Patent No.: US 7,958,301 B2
Sutardja  (45) Date of Patent: Jun. 7, 2011

(54) MEMORY CONTROLLER AND METHOD FOR MEMORY PAGES WITH DYNAMICALLY CONFIGURABLE BITS PER CELL

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 772 days.

(21) Appl. No.: 11/820,912

(22) Filed: Jun. 21, 2007

(65) Prior Publication Data

US 2008/0256319 A1  Oct. 16, 2008

Related U.S. Application Data

(60) Provisional application No. 60/910,938, filed on Apr. 10, 2007.

(51) Int. Cl.
*G06F 12/00* (2006.01)
*G06F 11/00* (2006.01)

(52) U.S. Cl. ......... 711/103; 714/5.1; 714/704; 714/708; 714/E12.008

(58) Field of Classification Search .................. 711/170, 711/203, 206, 103, E12.008; 714/6, 48, 52, 714/54, 5, 704, 708
See application file for complete search history.

(56) References Cited

U.S. PATENT DOCUMENTS

| | | | | |
|---|---|---|---|---|
| 5,260,970 A | * | 11/1993 | Henry et al. | 375/224 |
| 5,930,167 A | * | 7/1999 | Lee et al. | 365/185.03 |
| 6,119,245 A | * | 9/2000 | Hiratsuka | 714/7 |
| 6,456,528 B1 | | 9/2002 | Chen | |
| 7,318,117 B2 | * | 1/2008 | Lee et al. | 711/103 |
| 2002/0169936 A1 | | 11/2002 | Murphy | |
| 2003/0037299 A1 | * | 2/2003 | Smith | 714/763 |
| 2003/0053333 A1 | | 3/2003 | Rudelic et al. | |
| 2004/0145952 A1 | | 7/2004 | Chen et al. | |
| 2006/0067146 A1 | | 3/2006 | Woo et al. | |
| 2006/0075395 A1 | * | 4/2006 | Lee et al. | 717/168 |
| 2006/0107130 A1 | * | 5/2006 | Baker et al. | 714/710 |
| 2007/0073988 A1 | * | 3/2007 | Shibayama et al. | 711/165 |
| 2007/0079043 A1 | * | 4/2007 | Yu et al. | 710/305 |
| 2007/0143570 A1 | * | 6/2007 | Gorobets et al. | 711/203 |
| 2007/0233933 A1 | * | 10/2007 | Wang et al. | 711/100 |
| 2008/0019185 A1 | * | 1/2008 | Li | 365/185.22 |
| 2008/0072120 A1 | * | 3/2008 | Radke | 714/768 |
| 2008/0155524 A1 | * | 6/2008 | Shone et al. | 717/168 |

OTHER PUBLICATIONS

Jim Cooke, Micron Technology Inc.; "Flash memory 101: An Introduction to NAND flash"; Mar. 20, 2006; 10 pages.
PCT International Search Report for PCT Application No. US2008/004624 dated Jul. 28, 2008 and Written Opinion of the International Searching Authority; 13 pages.

* cited by examiner

*Primary Examiner* — Shane M Thomas

(57) ABSTRACT

A memory controller includes a page configure module that communicates with a memory array comprising B memory blocks each including P pages. The page configure module selectively configures memory cells in the P pages of each of the B memory blocks to store from 1 to T bits per cell. The page configure module also generates a memory map based on the configuration. B, P, and T are integers greater than 1. At least one of a write module selectively writes data to the memory array based on the memory map or a read module selectively reads data from the memory array based on the memory map.

52 Claims, 12 Drawing Sheets

US 7,958,301 B2

MEMORY CONTROLLER AND METHOD FOR MEMORY PAGES WITH DYNAMICALLY CONFIGURABLE BITS PER CELL

CROSS-REFERENCE TO RELATED APPLICATIONS

This application claims the benefit of U.S. Provisional Application No. 60/910,938, filed Apr. 10, 2007. The disclosure of the above application is incorporated herein by reference in its entirety.

FIELD

The present disclosure relates to memory controllers and, more particularly, to memory controllers for nonvolatile semiconductor memory.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Referring now to FIGS. 1, 2A and 2B, nonvolatile semiconductor memory 10 may include flash memory, static random access memory (SRAM), nitride read only memory (NROM), phase change memory, magnetic RAM, multi-state memory, etc. The nonvolatile semiconductor memory 10 may include one or more arrays 16. The array 16 may be arranged as B memory blocks 18-1, 18-2, . . . , and 18-B (collectively referred to as blocks 18).

In FIG. 2A, each block 18 includes P pages 20-1, 20-2, . . . , and 20-P (collectively referred to as pages 20). In FIG. 2B, each page 20 may include a plurality of memory cells that are associated with a data portion 24 and may include other memory cells that are associated with an overhead data portion 26 such as error checking and correcting (ECC) data or other (O) overhead data.

The nonvolatile semiconductor memory 10 typically communicates with a memory controller of a host device. Usually, the controller addresses the memory using a hardwired block size. Pages in the block may also have a hardwired page size. The number of memory cells in the data and overhead portions 24 and 26, respectively are also typically hardwired.

For example only, a typical NAND flash array may include 2048 blocks for a total of 2 Gigabytes (GB) of memory. Each block may comprise 128 kilobytes (kB) in 64 pages. Each page may include 2112 bytes. Of the 2112 bytes, 2048 bytes may be associated with the data portion and 64 bytes may be associated with the overhead portion. Each memory cell may store a bit. To erase data stored in the array, the memory controller typically requires either an entire block and/or an entire page to be erased.

In FIG. 2C, the memory block 18 includes predefined pages 50-1, 50-2, . . . , and 50-P (collectively referred to as pages 50). Each page 50 includes Y memory cells (memory cells 46-1, 46-2, . . . , and 46-Y) for the data portion and Z memory cells (memory cells 46-(Y+1), 46(Y+2), . . . , and 46(Y+Z)) for the overhead portion, where Y and Z are fixed values for a particular memory controller. During a first write operation for a first write data block, the memory controller writes data to pages 50-1 and 50-2 and part of page 50-3. During a second write operation for a second write data block, data is written to pages 50-4 and 50-5 and part of page 50-6. The remaining memory cells in pages 50-3 and 50-6 are unused, which is inefficient. Furthermore, the memory controller must be used with memory arrays having the same predefined configuration.

SUMMARY

A nonvolatile (NV) memory controller includes a page configure module that communicates with a NV memory array comprising B memory blocks each comprising P pages including a plurality of memory cells. The controller selectively adjusts a number of memory cells associated with at least one of the P pages and generates a memory map based thereon. At least one of a write module selectively writes data to the NV memory array based on the memory map or a read module selectively reads data from the NV memory array based on the memory map.

In other features, the memory map stores starting and ending points of memory cells for each of the P pages. The page configure module selectively adjusts a number of bits stored in at least one of the plurality of memory cells of at least one of the P pages. The page configure module may also selectively adjust a number of the P pages. The page configure module selectively adjusts a number of memory cells that store data relative to a number of memory cells that store error checking and correcting (ECC) data in at least one of the P pages. The memory map stores starting and ending points of memory cells for data portions and ECC portions of the at least one of the P pages.

In other features, a type determining module determines a memory type of the NV memory array and generates the memory map based on the memory type. The page configure module selectively configures memory cells in at least one of the P pages based on a type of data to be stored in the at least one of the P pages. A memory testing module determines an error rate of the memory cells in the at least one of the P pages. The page configure module determines the number of bits based on the error rate. The page configure module selectively sets a first number of bits per memory cell in a data portion of at least one of the P pages and selectively sets a second number of bits per memory cell in an overhead portion of the at least one of the P pages. The first and second numbers are different.

In other features, a method for operating a nonvolatile (NV) memory controller includes selectively adjusting a number of memory cells associated with at least one of P pages of a NV memory array. The NV memory array comprises B memory blocks each comprising the P pages. The method also includes generating a memory map based on adjusting the number of memory cells. The method also includes at least one of selectively writing data to the NV memory array based on the memory map and selectively reading data from the NV memory array based on the memory map.

In other features, the method includes storing starting and ending points of memory cells for each of the P pages in the memory map. The method also includes selectively adjusting a number of bits stored in at least one of the plurality of memory cells of at least one of the P pages. The method also includes selectively adjusting a number of memory cells that store data relative to a number of memory cells that store error checking and correcting (ECC) data in at least one of the P pages.

In other features, the method includes storing starting and ending points of memory cells for data portions and ECC portions of the at least one of the P pages in the memory map. The method also includes determining a memory type of the NV memory array and generating the memory map based on the memory type. The method also includes selectively configuring memory cells in at least one of the P pages based on a type of data to be stored in the at least one of the P pages. The method also includes determining an error rate of the memory cells in the at least one of the P pages.

In other features, the method includes determining the number of bits based on the error rate. The method also includes selectively setting a first number of bits per memory cell in a data portion of at least one of the P pages. The method also includes selectively setting a second number of bits per memory cell in an overhead portion of the at least one of the P pages. The first and second numbers are different.

In other features, a nonvolatile (NV) memory controller includes page configure means for communicating with a NV memory array comprising B memory blocks each comprising P pages including a plurality of memory cells. The page configure means selectively adjusts a number of memory cells associated with at least one of the P pages and generates a memory map based thereon. The controller also includes at least one of write means for selectively writing data to the NV memory array based on the memory map and read means for selectively reading data from the NV memory array based on the memory map.

In other features, the memory map stores starting and ending points of memory cells for each of the P pages. The page configure means selectively adjusts a number of bits stored in at least one of the plurality of memory cells of at least one of the P pages. The page configure means selectively adjusts a number of memory cells that store data relative to a number of memory cells that store error checking and correcting (ECC) data in at least one of the P pages. The memory map stores starting and ending points of memory cells for data portions and ECC portions of the at least one of the P pages.

In other features, the NV memory controller comprises type determining means for determining a memory type of the NV memory array that generates the memory map based on the memory type. The page configure means selectively configures memory cells in at least one of the P pages based on a type of data to be stored in the at least one of the P pages. A NV memory system comprises the memory controller and further comprises the NV memory array.

In other features, the NV memory controller includes memory testing means for determining an error rate of the memory cells in the at least one of the P pages. The page configure means determines the number of bits based on the error rate. The page configure means selectively sets a first number of bits per memory cell in a data portion of at least one of the P pages and selectively sets a second number of bits per memory cell in an overhead portion of the at least one of the P pages. The first and second numbers are different.

In still other features, the systems and methods described above are implemented by a computer program executed by one or more processors. The computer program can reside on a computer readable medium such as but not limited to memory, nonvolatile data storage and/or other suitable tangible storage mediums.

The computer program stored for use by a processor for controlling a nonvolatile (NV) memory selectively adjusts a number of memory cells associated with at least one of P pages of a NV memory array. The NV memory array comprises B memory blocks each comprising the P pages. The computer program includes generating a memory map based on adjusting the number of memory cells. The computer program also includes at least one of selectively writing data to the NV memory array based on the memory map and selectively reading data from the NV memory array based on the memory map.

In other features, the computer program includes storing starting and ending points of memory cells for each of the P pages in the memory map. The computer program also includes selectively adjusting a number of bits stored in at least one of the plurality of memory cells of at least one of the P pages. The computer program also includes selectively adjusting a number of memory cells that store data relative to a number of memory cells that store error checking and correcting (ECC) data in at least one of the P pages.

In other features, the computer program includes storing starting and ending points of memory cells for data portions and ECC portions of the at least one of the P pages in the memory map. The computer program also includes determining a memory type of the NV memory array. The computer program also includes generating the memory map based on the memory type. The computer program also includes selectively configuring memory cells in at least one of the P pages based on a type of data to be stored in the at least one of the P pages.

In other features, the computer program includes determining an error rate of the memory cells in the at least one of the P pages. The computer program also includes determining the number of bits based on the error rate. The computer program also includes selectively setting a first number of bits per memory cell in a data portion of at least one of the P pages. The computer program also includes selectively setting a second number of bits per memory cell in an overhead portion of the at least one of the P pages. The first and second numbers are different.

In other features, a memory controller includes a page configure module that communicates with a memory array comprising B memory blocks each including P pages. The page configure module selectively configures memory cells in the P pages of each of the B memory blocks to store from 1 to T bits per cell. The page configure module also generates a memory map based on the configuration. B, P, and T are integers greater than 1. At least one of a write module selectively writes data to the memory array based on the memory map or a read module selectively reads data from the memory array based on the memory map.

In other features, the memory cells in at least one of the P pages of one of the B blocks store a first number of bits. The memory cells in at least one of the P pages of another of the B blocks store a second number of bits. The first and second number are different and are stored in the memory map. The memory array includes a first portion including at least one of the B blocks. The memory cells associated with the P pages in the at least one of the B blocks are configured to store one bit. The memory array includes a second portion including others of the B blocks. The memory cells associate with the P pages in the others of the B blocks are configured to store more than one bit.

In other features, the first portion stores a boot code. The first portion also stores configuration data for configuring the second portion. The memory map stores starting and ending locations of memory cells for each of the P pages. The page configure module selects a number of the memory cells for a respective one of the P pages based on the number of bits stored by the memory cells in the respective one of the P pages. The memory map stores starting and ending locations of memory cells for data portions and error checking and correcting (ECC) portions of the at least one of the P pages. The page configure module selectively adjusts a number of the memory cells that store data relative to a number of the memory cells that store ECC data in at least one of the ECC portions.

In other features, the page configure module selectively configures the memory cells in at least one of the P pages based on a type of data to be stored in the at least one of the P pages. A memory testing module determines an error rate of the memory cells in the at least one of the P pages. The page configure module determines the number of bits stored by at least one of the P pages based on the error rate.

In other features, a method for operating a memory controller includes configuring memory cells in P pages of each of B memory blocks to store from 1 to T bits per cell. The method also includes generating a memory map based on the configuration, where B, P, and T are integers greater than 1. The method also includes at least one of selectively writing data to the memory array based on the memory map and selectively reading data from the memory array based on the memory map.

In other features, the method includes storing a first number of bits in the memory cells in at least one of the P pages of one of the B blocks. The method also includes storing a second number of bits in the memory cells in at least one of the P pages of another of the B blocks. The method also includes storing the first and second number in the memory map. The first and second number are different. The method also includes configuring the memory cells associated with the P pages in at least one of B blocks in a first portion of the memory array to store one bit. The method also includes configuring the memory cells associate with the P pages in a second portion of the memory array in others of the B blocks to store more than one bit.

In other features, the method includes storing a boot code in the first portion. The method also includes storing configuration data for configuring the second portion in the first portion. The method also includes storing starting and ending locations of memory cells for each of the P pages in the memory map. The method also includes selecting a number of the memory cells for a respective one of the P pages based on the number of bits stored by the memory cells in the respective one of the P pages.

In other features, the method includes storing starting and ending locations of memory cells for data portions and error checking and correcting (ECC) portions of the at least one of the P pages in the memory map. The method also includes selectively adjusting a number of the memory cells that store data relative to a number of the memory cells that store ECC data in at least one of the ECC portions. The method also includes selectively configuring the memory cells in at least one of the P pages based on a type of data to be stored in the at least one of the P pages.

In other features, a memory controller includes page configure means for communicating with memory means for storing data comprising B memory blocks each including P pages. The page configure means selectively configures memory cells in the P pages of each of the B memory blocks to store from 1 to T bits per cell and that generates a memory map based on the configuration. B, P, and T are integers greater than 1. The memory controller also includes at least one of writing means for selectively writing data to the memory array based on the memory map or reading means for selectively reading data from the memory means based on the memory map.

In other features, the memory cells in at least one of the P pages of one of the B blocks store a first number of bits and the memory cells in at least one of the P pages of another of the B blocks store a second number of bits. The first and second number are different and are stored in the memory map. The memory means includes a first portion including at least one of the B blocks. The memory cells associated with the P pages in the at least one of the B blocks are configured to store one bit. The memory means includes a second portion including others of the B blocks. The memory cells associate with the P pages in the others of the B blocks are configured to store more than one bit.

In other features, the first portion stores a boot code. The first portion also stores configuration data for configuring the second portion. The memory map stores starting and ending locations of memory cells for each of the P pages. The page configure means selects a number of the memory cells for a respective one of the P pages based on the number of bits stored by the memory cells in the respective one of the P pages. The memory map stores starting and ending locations of memory cells for data portions and error checking and correcting (ECC) portions of the at least one of the P pages. The page configure means selectively adjusts a number of the memory cells that store data relative to a number of the memory cells that store ECC data in at least one of the ECC portions.

In other features, the page configure means selectively configures the memory cells in at least one of the P pages based on a type of data to be stored in the at least one of the P pages. The memory controller includes memory testing means for determining an error rate of the memory cells in the at least one of the P pages. The page configure means determines the number of bits stored by at least one of the P pages based on the error rate.

In still other features, the systems and methods described above are implemented by a computer program executed by one or more processors. The computer program can reside on a computer readable medium such as but not limited to memory, nonvolatile data storage and/or other suitable tangible storage mediums.

The computer program stored for use by a processor for operating memory includes configuring memory cells in P pages of each of B memory blocks to store from 1 to T bits per cell. The computer program also includes generating a memory map based on the configuration, where B, P, and T are integers greater than 1. The computer program also includes at least one of selectively writing data to the memory array based on the memory map or selectively reading data from the memory array based on the memory map.

In other features, the computer program includes storing a first number of bits in the memory cells in at least one of the P pages of one of the B blocks. The computer program also includes storing a second number of bits in the memory cells in at least one of the P pages of another of the B blocks. The computer program also includes storing the first and second number in the memory map. The first and second number are different.

In other features, the computer program includes configuring the memory cells associated with the P pages in at least one of B blocks in a first portion of the memory array to store one bit. The computer program also includes configuring the memory cells associate with the P pages in a second portion of the memory array in others of the B blocks to store more than one bit.

In other features, the computer program also includes storing a boot code in the first portion. The computer program also includes storing configuration data for configuring the second portion in the first portion. The computer program also includes storing starting and ending locations of memory cells for each of the P pages in the memory map. The computer program also includes selecting a number of the memory cells for a respective one of the P pages based on the number of bits stored by the memory cells in the respective one of the P pages.

In other features, the computer program also includes storing starting and ending locations of memory cells for data portions and error checking and correcting (ECC) portions of the at least one of the P pages in the memory map. The computer program also includes selectively adjusting a number of the memory cells that store data relative to a number of the memory cells that store ECC data in at least one of the ECC portions. The computer program also includes selectively configuring the memory cells in at least one of the P pages based on a type of data to be stored in the at least one of the P pages.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 2A:
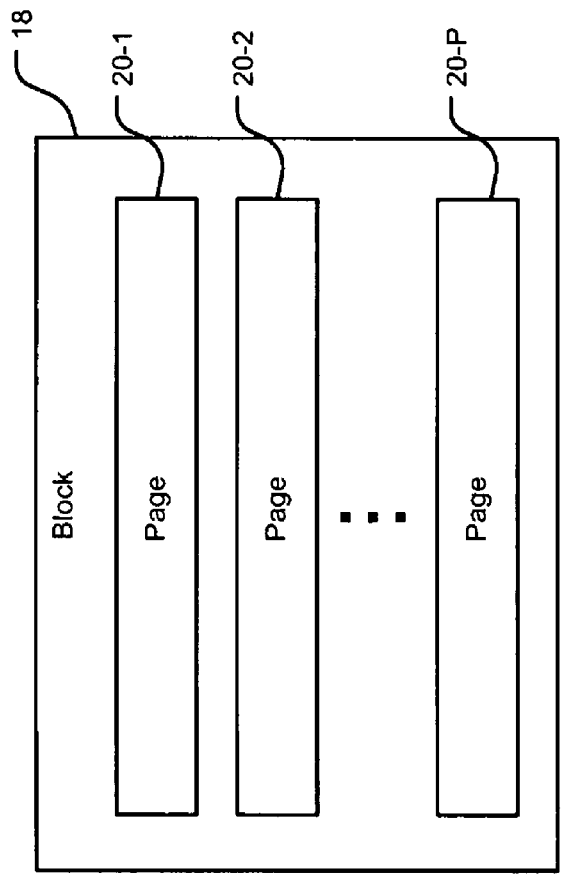
FIG. 2A illustrates pages within the blocks of memory according to the prior art.
Figure 2B:
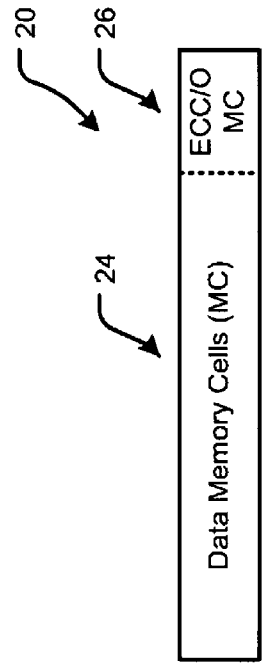
FIG. 2B illustrates memory cells within the pages according to the prior art.
Figure 1:
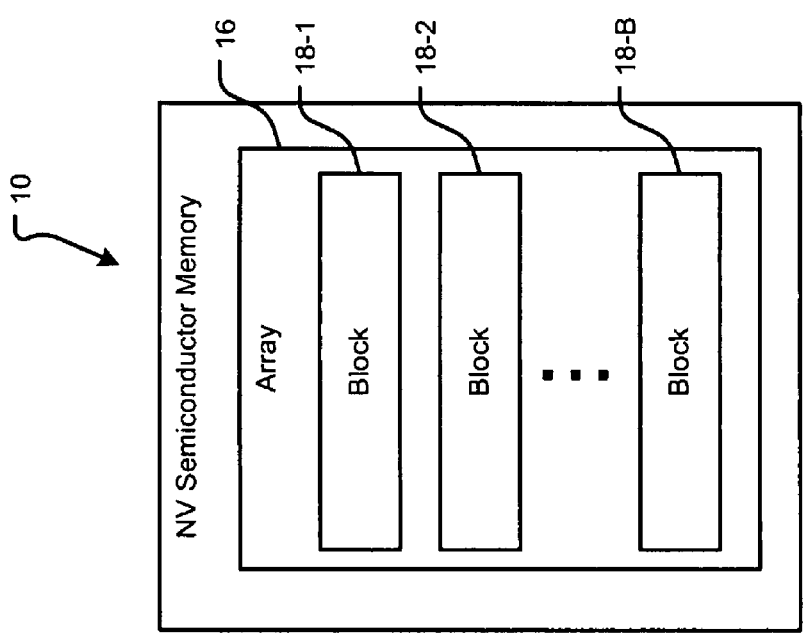
FIG. 1 is a functional block diagram of memory including blocks according to the prior art.
Figure 2C:
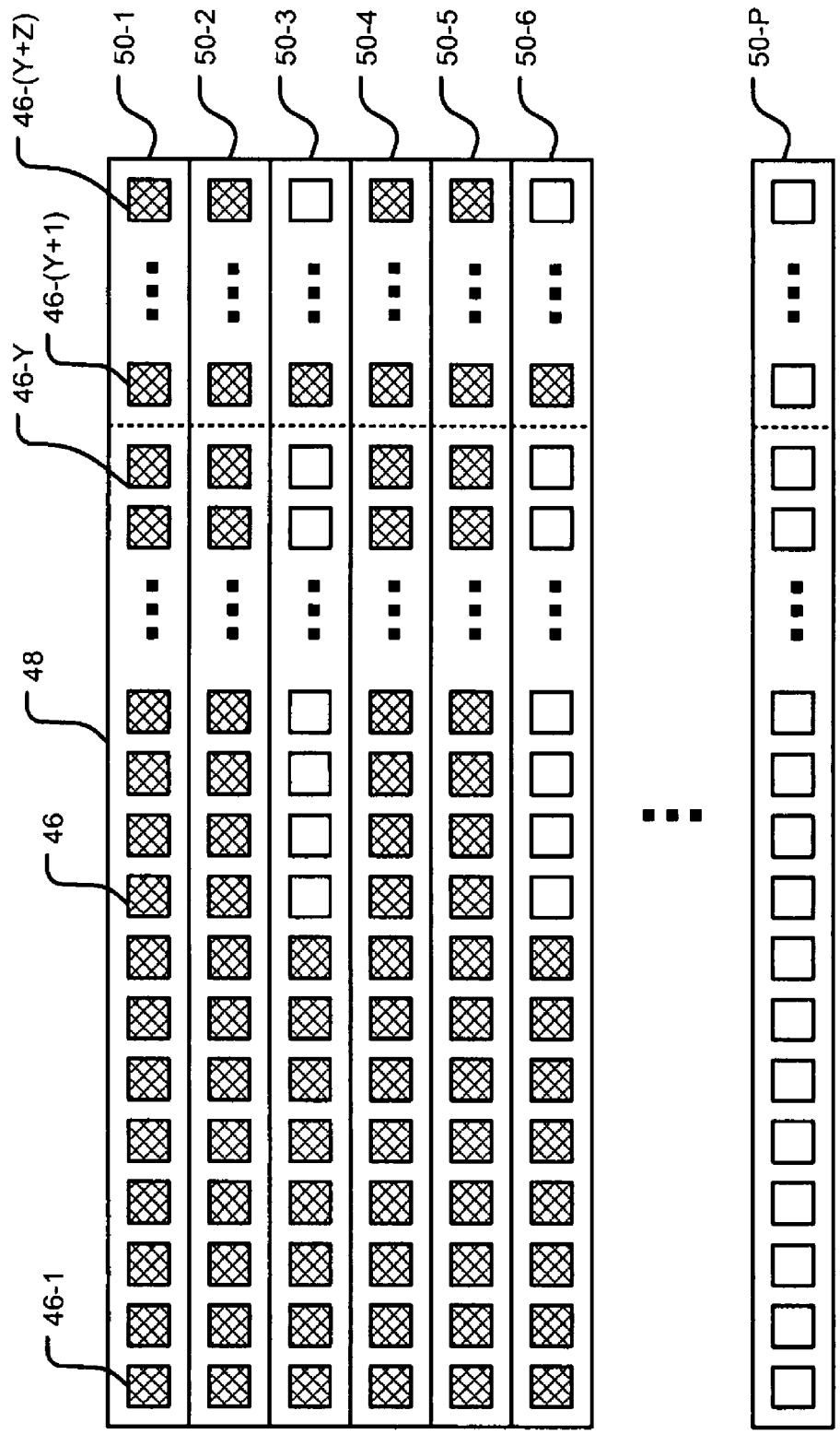
FIG. 2C illustrates memory cells arranged in a memory block according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. It should be understood that steps within a method may be executed in a different order without altering the principles of the present disclosure.

The present disclosure describes a memory controller that can operate with memory having different configurations as well as reconfigurable memory. For example, to increase memory storage, memory arrays may include memory cells that store more than one bit. When the memory includes multi-bit memory cells, memory controllers having hardwired block and page arrangements cannot be used. For example, if each memory cell stores 2 bits, each page requires one half as many memory cells as the conventional memory array. In other words, as the number of levels or bits M stored in each memory cell increases, the size or number of memory cells per page is reduced by 1/M. If the memory controller is hardwired for fixed block and page sizes, the memory controller will be unable to accommodate the multi-bit memory cells.

In addition, certain types of data may not align properly with the preconfigured page size of a conventional controller. Since pages and/or blocks must be erased as a group, parts of pages may be left unused, which is inefficient. The present disclosure describes a memory controller that can adjust or vary page length and/or cell density. Variable page length refers to varying the number of memory cells for one or more pages. Variable cell density refers to varying the number of bits stored per memory cell.

While memory controllers having a conventional design may be set up to handle multi-bit memory cells, these controllers will then be unable to handle conventional memory having single-bit memory cells. Memory cells that store more than one bit per cell tend to have higher error rates. Therefore, the number of bits allocated for overhead such as error correcting code (ECC) may be different depending upon the number of bits per cell. For certain types of memory, such as phase change memory, the error rate may vary from one integrated circuit to another. Some memory such as, phase change memory, may be configured to store a variable number of bits per memory cell. As the number of bits per cell increases, the error rate may also tend to increase.

The present disclosure discloses a memory controller that selectively configures one or more pages in a memory block to have variable memory cell starting locations/points and ending locations/points or physical addresses. The block size may remain fixed. The memory control system may also selectively vary a density (in other words, the number of bits) stored by each memory cell. Furthermore, the relationship between the number of memory cells in a page that are allocated for the data portion relative to the number of memory cells allocated for the overhead portion may also be varied.

Figure 3A:
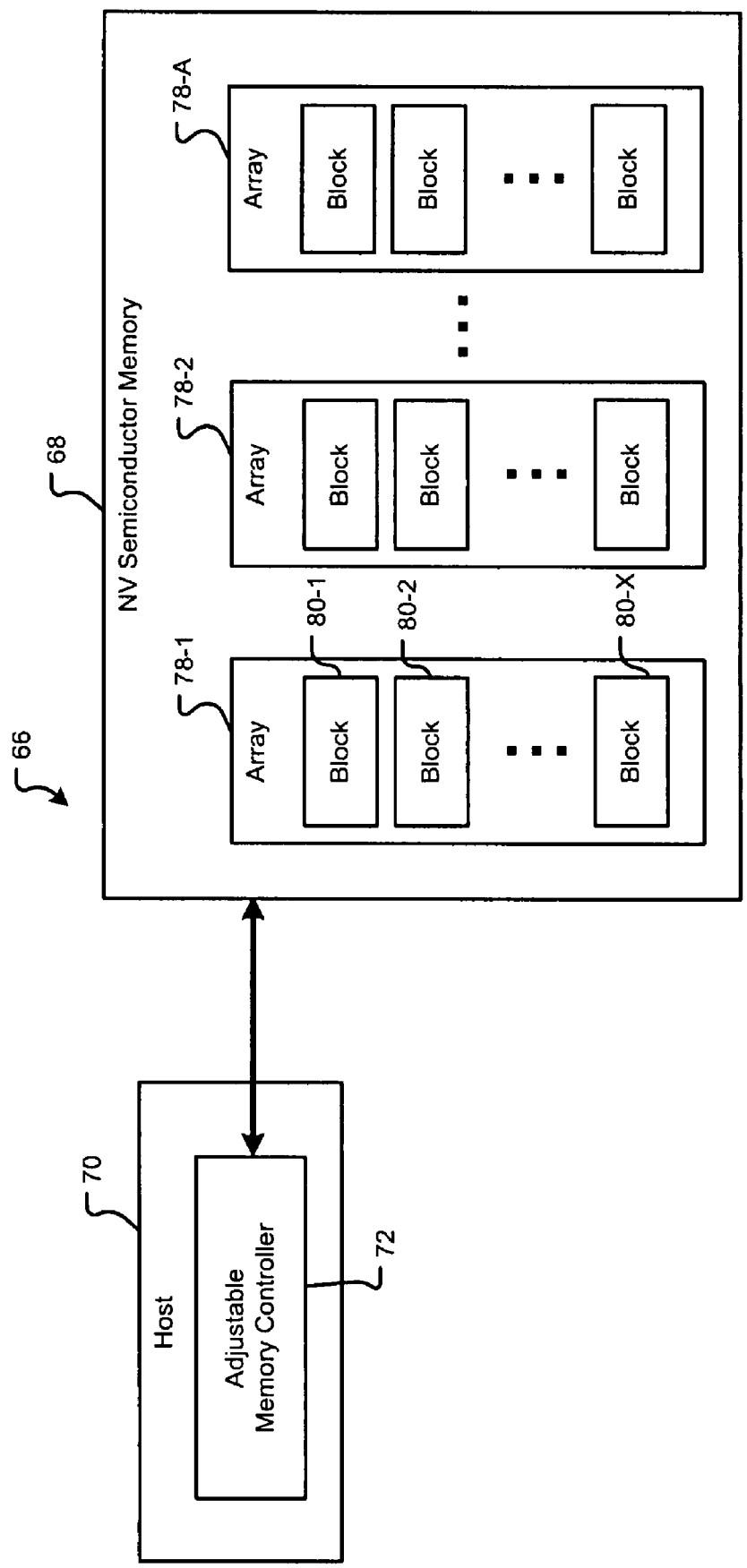
FIG. 3A is a functional block diagram of a memory system according to the present disclosure with an adjustable memory controller.

Referring now to FIGS. 3A-3D, an adjustable memory system 66 for nonvolatile semiconductor memory 68 is illustrated. In FIG. 3A, a host device 70 includes an adjustable memory controller 72. The adjustable memory controller 72 varies the number of memory cells per page in nonvolatile semiconductor memory 68. The adjustable memory controller 72 can vary the number of memory cells allocated for the data portion and for the overhead portion for each page. The adjustable memory controller 72 can vary the density (the number of bits) stored by each memory cell.

Figure 3B:
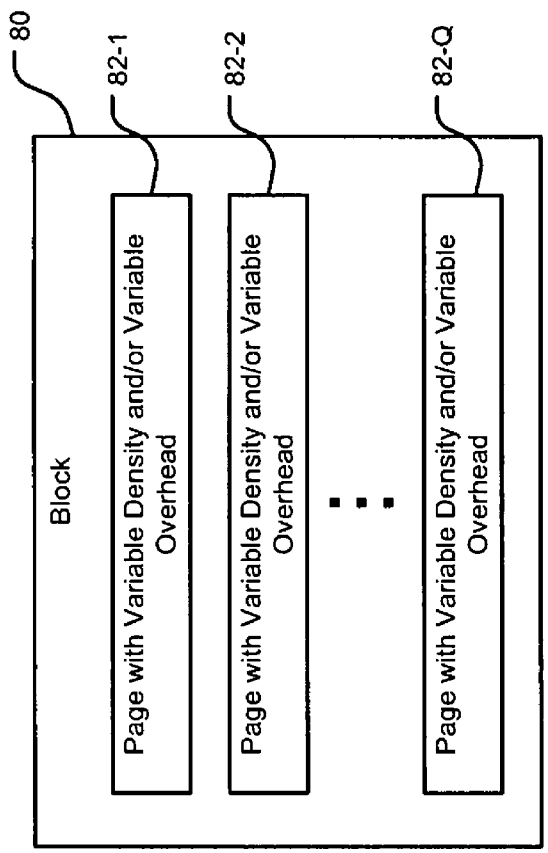
FIG. 3B illustrates a memory block including pages with variable density, page length and/or overhead.
Figure 3C:
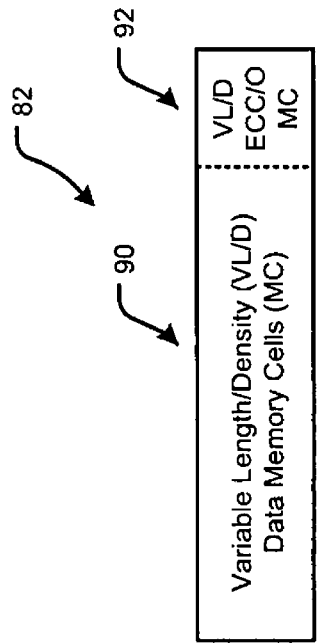
FIG. 3C illustrates a page including memory cells associated with a data portion and an overhead portion.

The nonvolatile semiconductor memory 68 may include one or more arrays 78-1, 78-2, . . . , and 78-A (collectively array 78) of memory cells. The array 78 may be arranged in memory blocks 80-1, 80-2, . . . , and 80-X (collectively referred to as blocks 80). In FIG. 3B, each block 80 includes pages 82-1, 82-2, . . . , and 82-Q (collectively referred to as pages 82). The adjustable memory controller 72 can vary the number of memory cells per page, the number of bits per memory cell, and/or the relative number of memory cells associated with the data portion and the overhead portion, respectively. In FIG. 3C, each page 82 includes memory cells that are associated with a data portion 90 and other memory cells that are associated with an overhead portion 92.

Figure 3D:
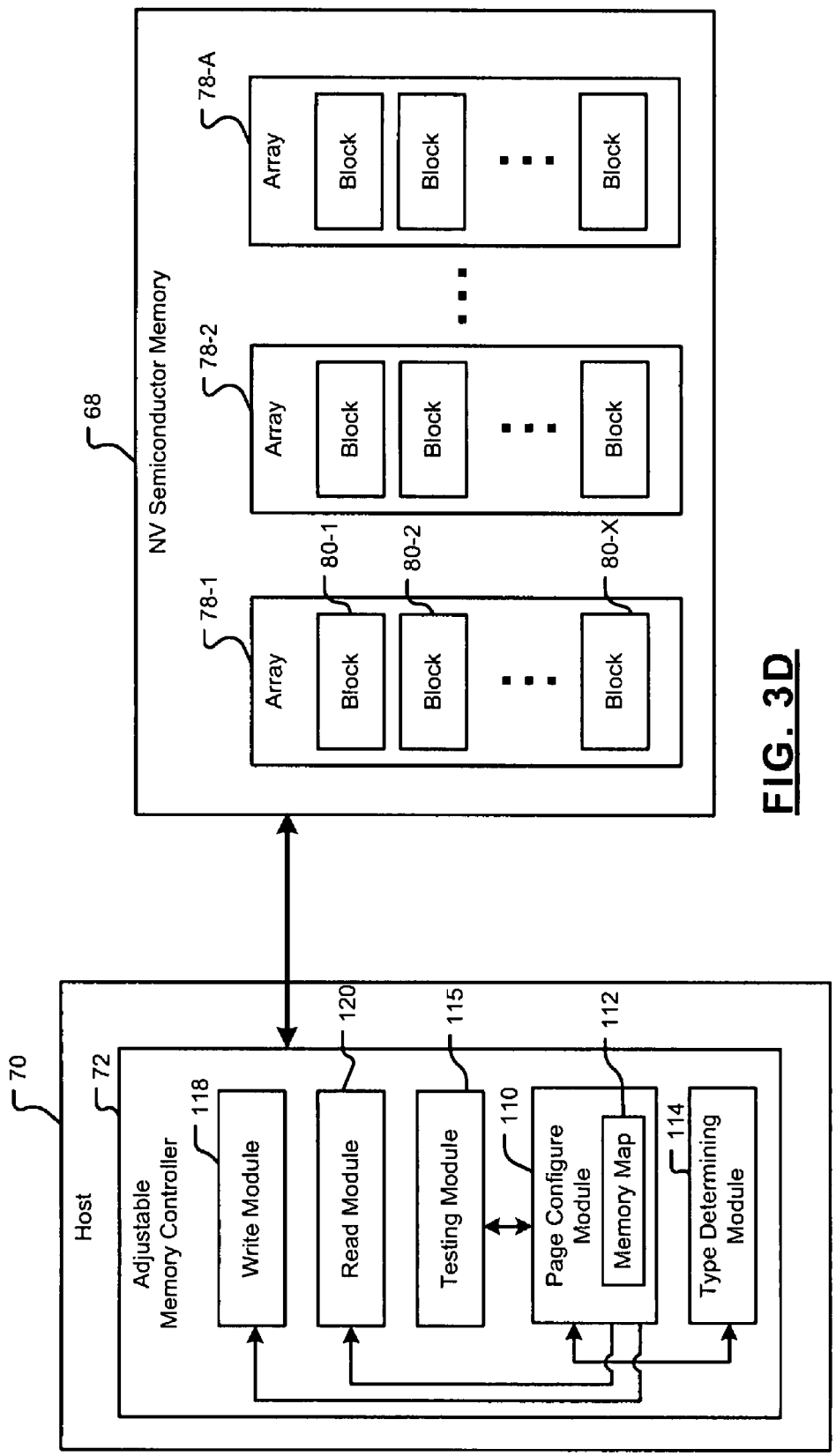
FIG. 3D is an exemplary functional block diagram of the memory system of FIG. 3A in further detail.

In FIG. 3D, the adjustable memory controller 72 communicates with the memory 68. The adjustable memory controller 72 includes a page configure module 110 that generates a memory map 112, a type determining module 114 and/or a memory testing module 115. The testing module 115 may determine error rates of memory cells at various densities by writing known values, reading them back and comparing the read back values to the known values. The type determining module 114 may be used to determine a type of memory that has been connected to the memory 68. The type determining module 114 may use any method such as but not limited to communicating with the memory 68 and receiving configuration information. The configuration information may be stored in a setup portion of the memory 68 having a standard or predetermined configuration. The adjustable memory controller 72 may read the setup portion and configure the rest of the memory 68.

For example, the setup portion of the memory 68 may be configured to store one bit or another predetermined number of bits. The page length may be set based on the predetermined number of bits. In other words, the setup portion may have a standard or predetermined configuration. The remaining portion of the memory 68 may be configured by the page configure module 110 based on the data, code or other information stored in the setup portion. The setup portion of the memory 68 may be written to by the page configure module 110 during operation to allow changes to the configuration. The memory map or a portion thereof may also be stored in the setup portion.

Once the memory type is determined, the type determining module 114 may communicate memory configuration information to the page configure module 110. Based on the information, the page configure module 110 may determine the number of bits per memory cell for the remaining portion. The page configure module 110 may determine start and stop locations or physical addresses for each page. The page configure module 110 may also determine the relationship between the number of bits or bytes in the data portion relative to the number of bits or bytes in the overhead portion. The page configure module 110 may generate the memory map 112. In other words, the page configure module 110 may determine the start and end of locations or addresses for each page, the density of memory cells, the number of ECC/O bytes per page and generate the memory map 112 based thereon.

The adjustable memory controller 72 includes a write module 118 and a read module 120, which read and write data to and from the memory 68 based on the memory map 112. The write and read modules 118 and 120, respectively may employ column and row select modules (not shown) to select memory cells within the memory 68. During a write operation, the write module 118 selects write target cells, which may include any number of memory cells, such as a particular cell, a row of cells, a column of cells, a block of cells, a page of cells, etc. Once the write target cells are selected, the write module 118 generates a write signal.

During a read operation, the read module 120 selects read target cells, which may include any number of memory cells, such as a particular cell, a row of cells, a column of cells, a block of cells, a page of cells, etc. Once the read target cells are selected, the read module 120 reads the read target cells.

Figure 3E:
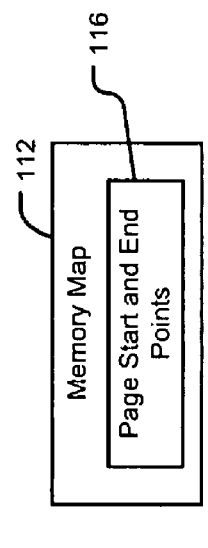
FIG. 3E illustrates an exemplary memory map.

In FIG. 3E, the memory map 112 may include start and end locations of memory cells in a page. The memory map 112 may also include start and end locations of the data portions and overhead portions in the pages.

Figure 4A:
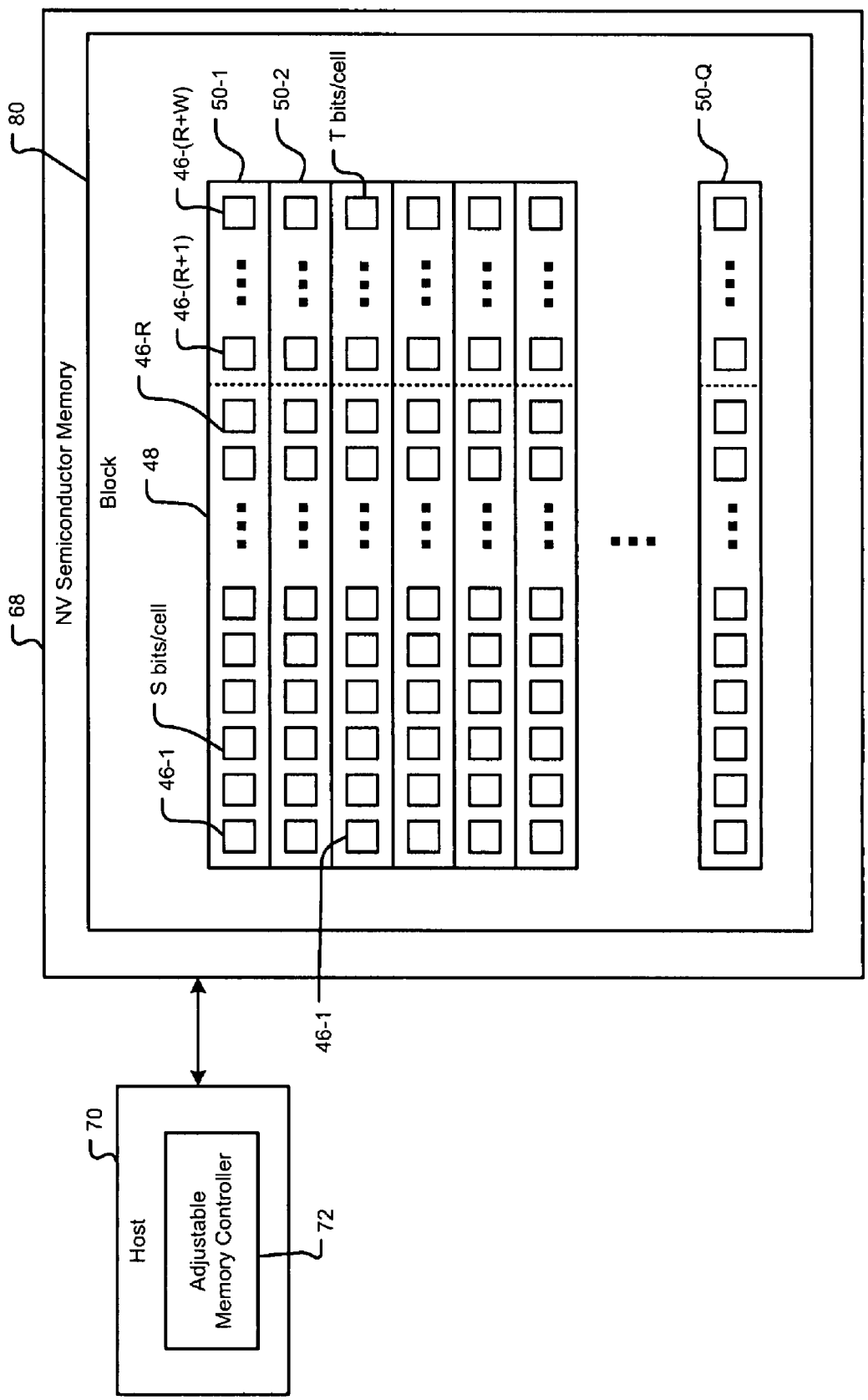
FIG. 4A illustrates pages of exemplary memory blocks.

Referring now to FIG. 4A, the adjustable memory controller 72 may reconfigure the number of bits per cell (cell density) while keeping page size constant, increase/reduce page size based on the number of bits per memory cell, and/or vary the number of memory cells used for data and/or overhead portions. If the cell density varies, the memory map 112 may be used to identify the cell density for one or more pages and/or groups of pages, one or more blocks and/or groups of blocks, and/or the entire memory.

The data portion of one or more pages may include R memory cells each storing S bits per memory cell. One or more of the overhead portions may include W memory cells each storing T bits per memory cell where S and T are integers greater than zero. S may be equal to T or not equal to T.

Figure 4B:
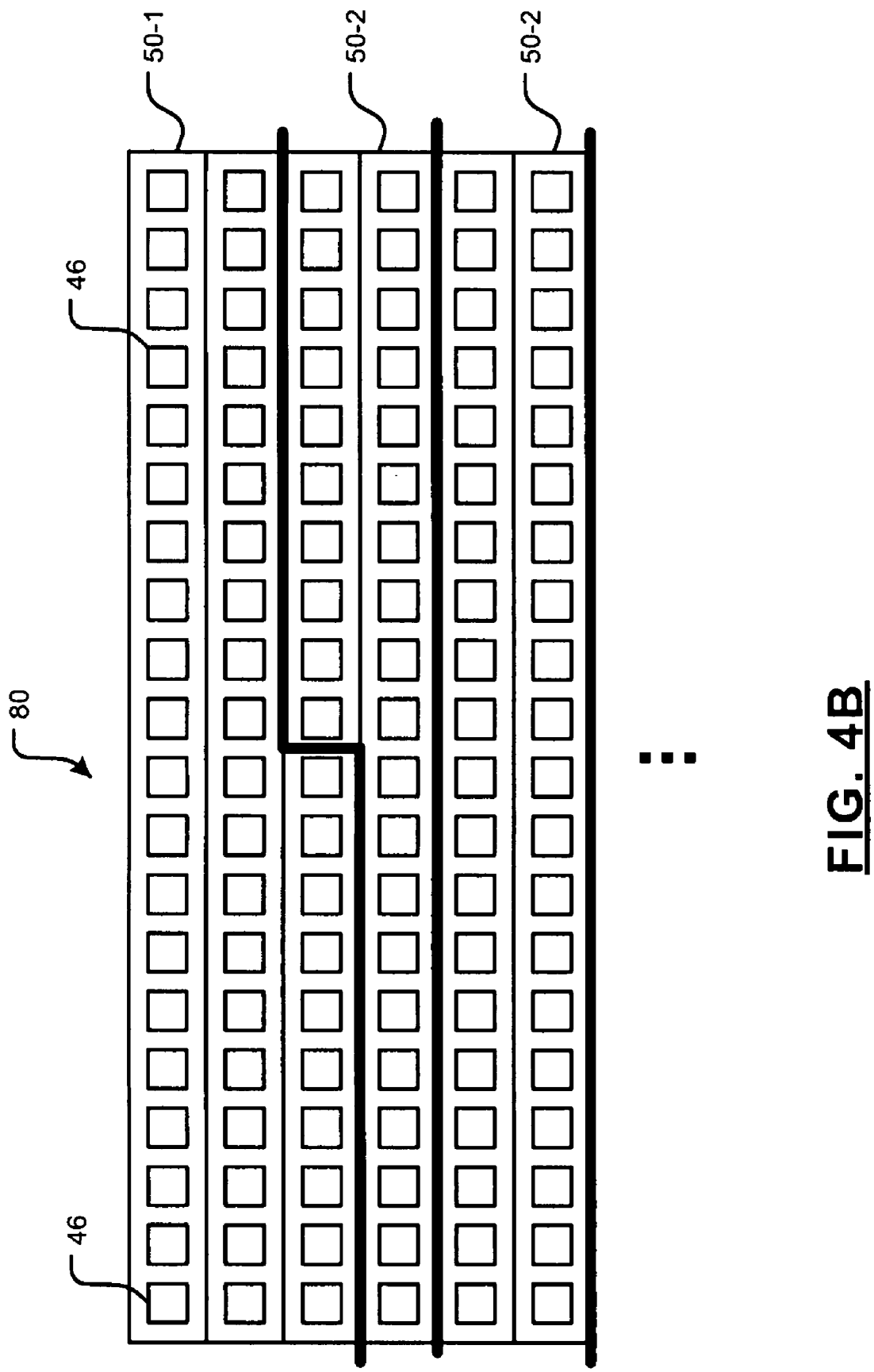
FIG. 4B illustrates other exemplary pages in a block.

While FIG. 4A shows the memory cells of a page arranged as rows, the memory cells of a page may not necessarily be in the same row. Referring now to FIG. 4B, the pages may be variable length from one page to another and may include one or more rows.

With configurable cell density and/or page size, the memory controller may be used with different memory array architectures. These variances may be by design (i.e., a single solution controller for different products) or may be a result of the uncertainties in manufacturing (i.e., some memories may be able to achieve lower noise and higher precision, thus allowing higher density).

The page configure module may set the density and/or the number of ECC/O bytes for each page based on the type of data that is to be stored. For example, data such as music and/or video data may be able to handle higher data rates as compared to program code or other more error-sensitive data.

The page configure module may vary the density based on the type of data to be stored. For example, video and audio may have higher density due to their ability to withstand errors. More sensitive data such as code, numerical data, user files, etc. may be stored with lower density to allow lower data error rates.

As the number of bits per memory cell increases, the error rate tends to increase. The page configure module may vary cell density of the data and overhead portions. Therefore, the page configure module may increase the number of bits per memory cell for data that can withstand higher error rates. For example only, the number of bits per memory cell can be higher for audio and video data. For more error sensitive data, the number of bits per memory cell can be set lower.

Referring now to FIGS. 5A-5G, various exemplary implementations incorporating the teachings of the present disclosure are shown.

Figure 5A:
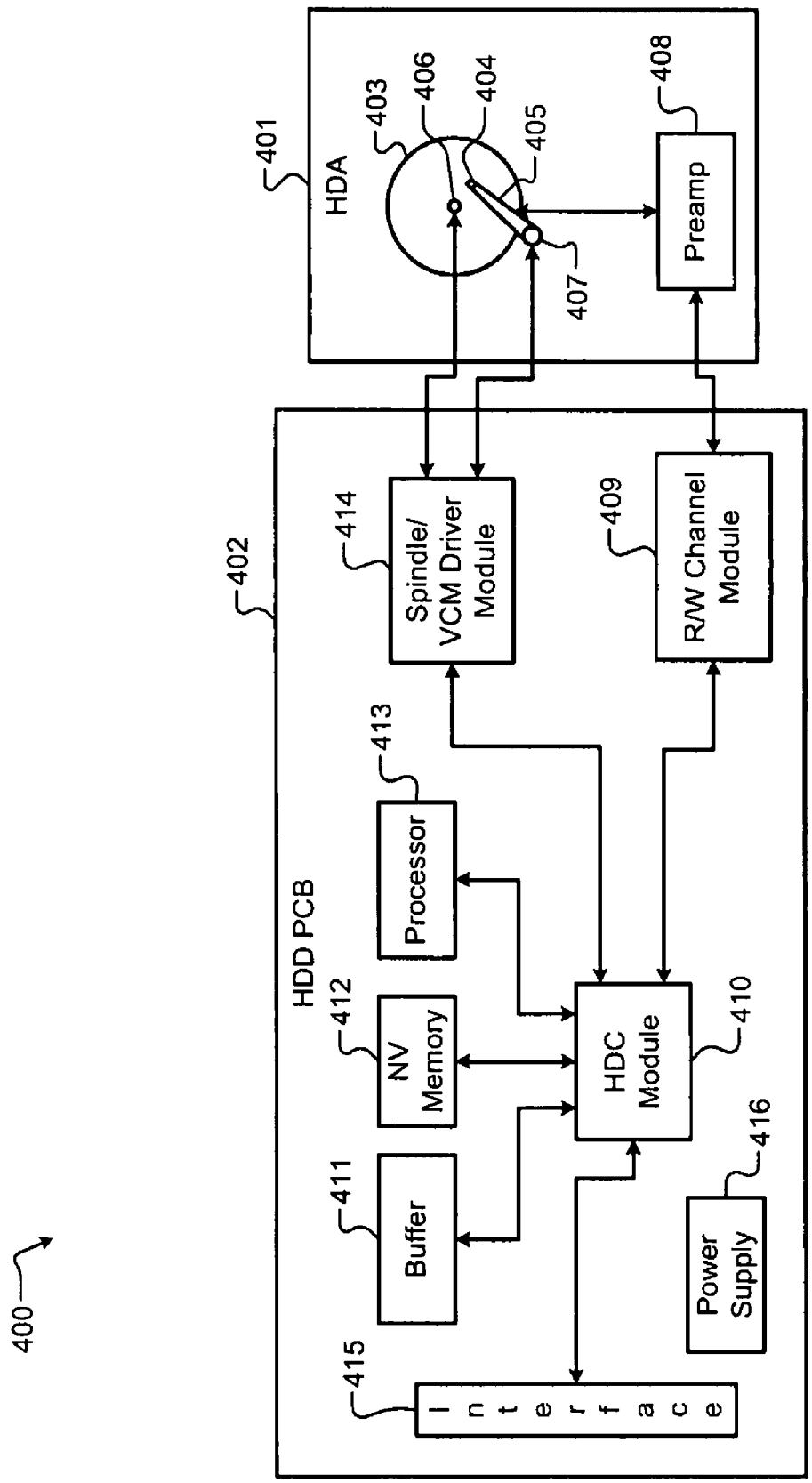
FIG. 5A is a functional block diagram of a hard disk drive.

Referring now to FIG. 5A, the teachings of the disclosure can be implemented in memory of a hard disk drive (HDD) 400. The HDD 400 includes a hard disk assembly (HDA) 401 and a HDD PCB 402. The HDA 401 may include a magnetic medium 403, such as one or more platters that store data, and a read/write device 404. The read/write device 404 may be arranged on an actuator arm 405 and may read and write data on the magnetic medium 403. Additionally, the HDA 401 includes a spindle motor 406 that rotates the magnetic medium 403 and a voice-coil motor (VCM) 407 that actuates the actuator arm 405. A preamplifier device 408 amplifies signals generated by the read/write device 404 during read operations and provides signals to the read/write device 404 during write operations.

The HDD PCB 402 includes a read/write channel module (hereinafter, "read channel") 409, a hard disk controller (HDC) module 410, a buffer 411, nonvolatile memory 412, a processor 413, and a spindle/VCM driver module 414. The read channel 409 processes data received from and transmitted to the preamplifier device 408. The HDC module 410 controls components of the HDA 401 and communicates with an external device (not shown) via an I/O interface 415. The external device may include a computer, a multimedia device, a mobile computing device, etc. The I/O interface 415 may include wireline and/or wireless communication links.

The HDC module 410 may receive data from the HDA 401, the read channel 409, the buffer 411, nonvolatile memory 412, the processor 413, the spindle/VCM driver module 414, and/or the I/O interface 415. The processor 413 may process the data, including encoding, decoding, filtering, and/or formatting. The processed data may be output to the HDA 401, the read channel 409, the buffer 411, nonvolatile memory 412, the processor 413, the spindle/VCM driver module 414, and/or the I/O interface 415.

The HDC module 410 may use the buffer 411 and/or nonvolatile memory 412 to store data related to the control and operation of the HDD 400. The buffer 411 may include DRAM, SDRAM, etc. The nonvolatile memory 412 may include flash memory (including NAND and NOR flash memory), phase change memory, magnetic RAM, or multi-state memory, in which each memory cell has more than two states. The spindle/VCM driver module 414 controls the spindle motor 406 and the VCM 407. The HDD PCB 402 includes a power supply 416 that provides power to the components of the HDD 400.

Figure 5B:
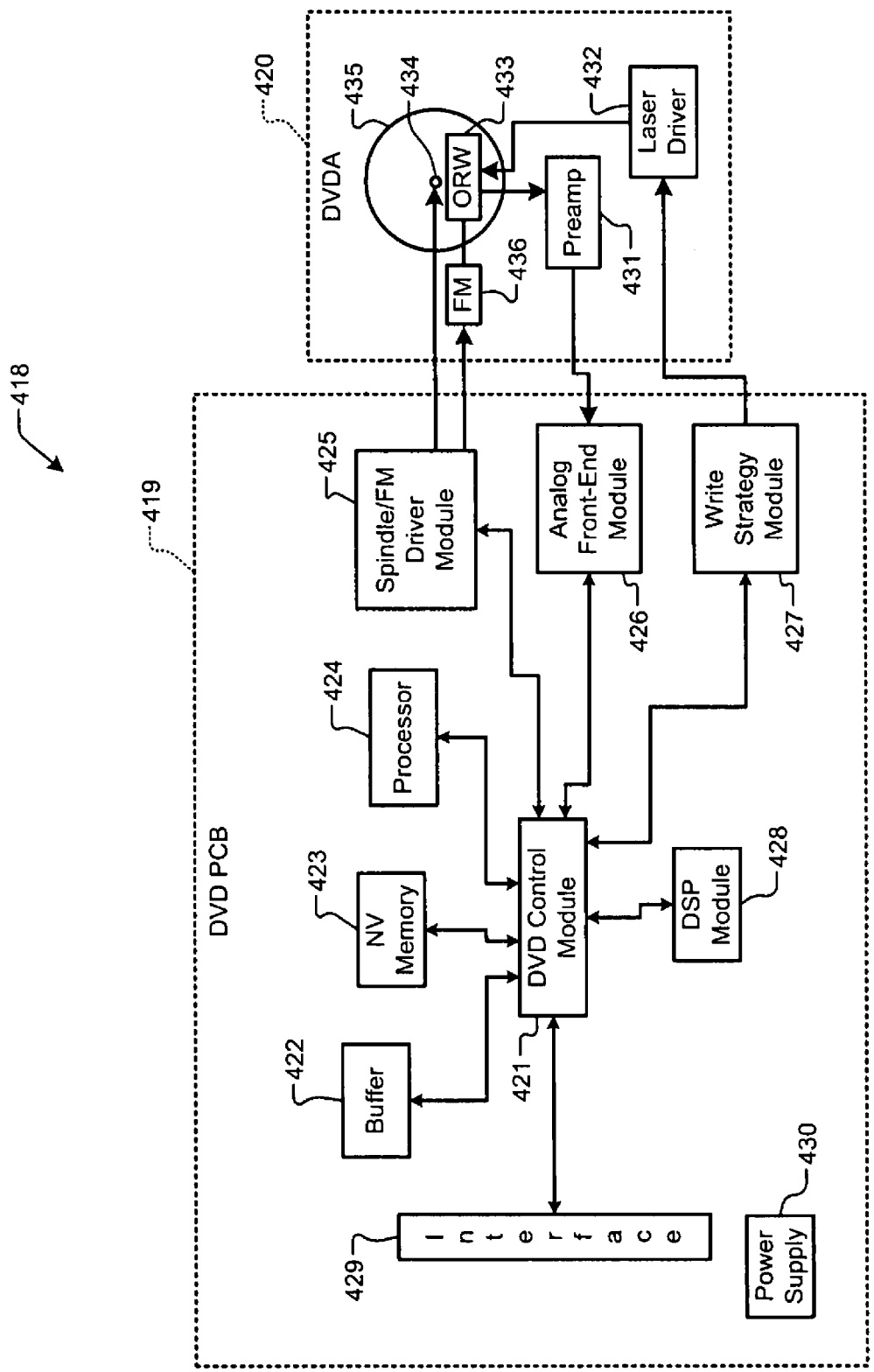
FIG. 5B is a functional block diagram of a DVD drive.

Referring now to FIG. 5B, the teachings of the disclosure can be implemented in memory of a DVD drive 418 or of a CD drive (not shown). The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing information to the laser driver 432. The laser driver 432 controls the optical device 433 to write data to the optical storage medium 435.

Figure 5D:
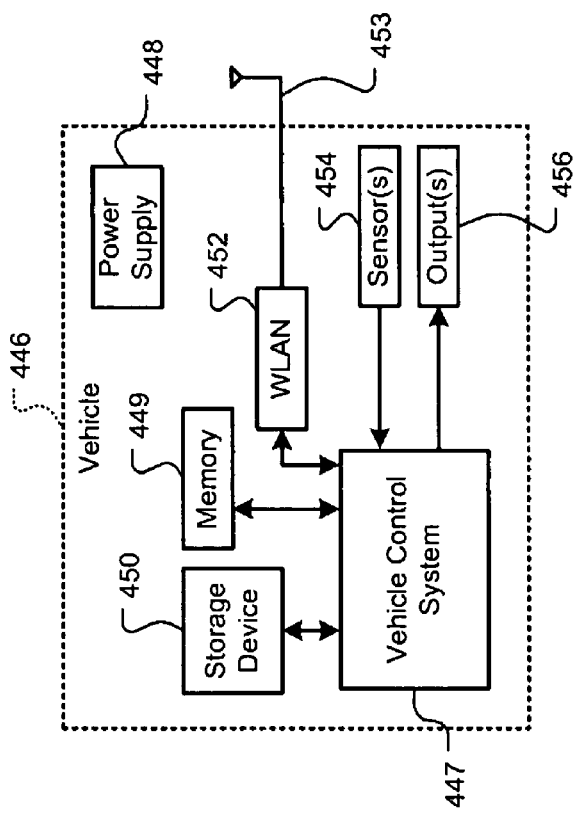
FIG. 5D is a functional block diagram of a vehicle control system.
Figure 5C:
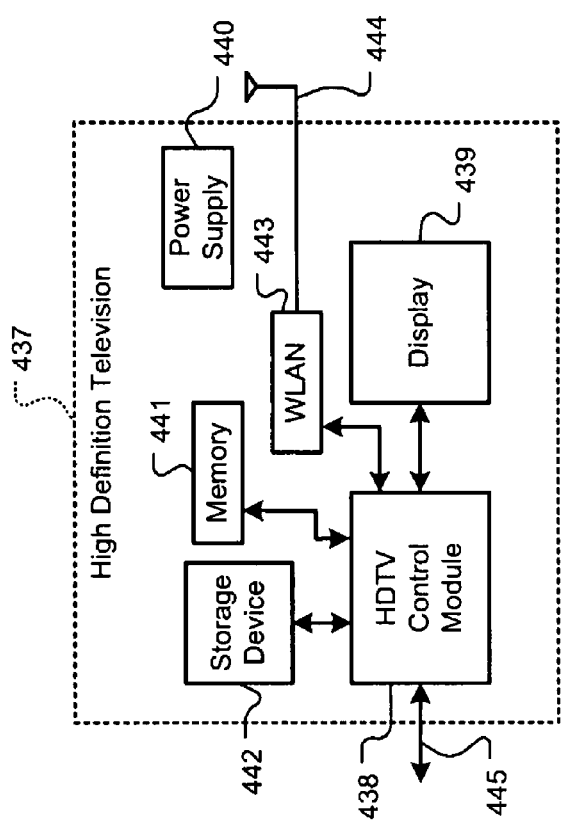
FIG. 5C is a functional block diagram of a high definition television.

Referring now to FIG. 5C, the teachings of the disclosure can be implemented in memory of a high definition television (HDTV) 437. The HDTV 437 includes a HDTV control module 438, a display 439, a power supply 440, memory 441, a storage device 442, a WLAN interface 443 and associated antenna 444, and an external interface 445.

The HDTV 437 can receive input signals from the WLAN interface 443 and/or the external interface 445, which sends and receives information via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the WLAN interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the WLAN interface 443 and/or the external interface 445. The power supply 440 provides power to the components of the HDTV 437.

Referring now to FIG. 5D, the teachings of the disclosure may be implemented in memory of a vehicle 446. The vehicle 446 may include a vehicle control system 447, a power supply 448, memory 449, a storage device 450, and a WLAN interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WLAN interface 452.

Figure 5F:
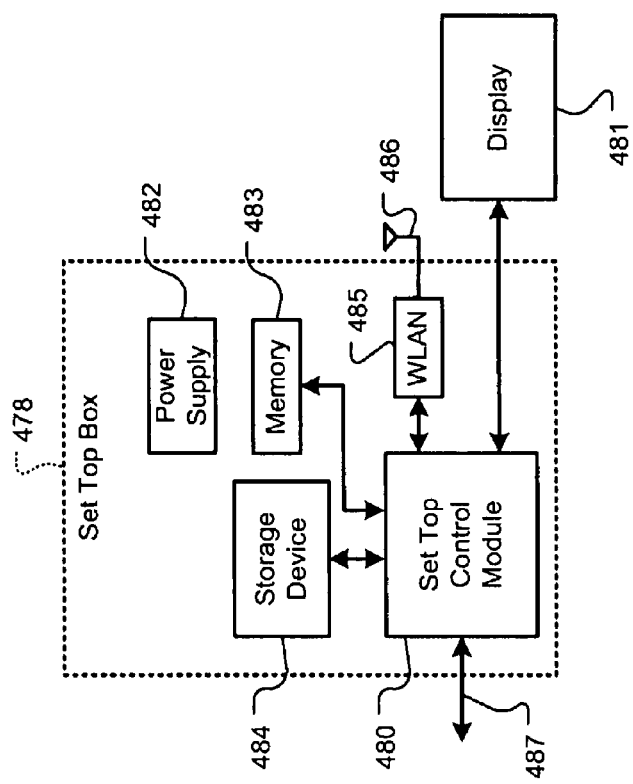
FIG. 5F is a functional block diagram of a set top box.
Figure 5E:
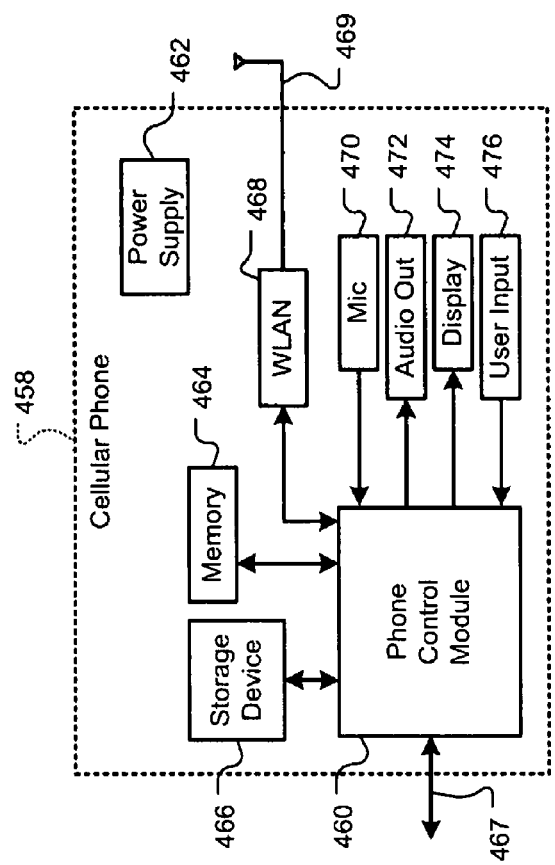
FIG. 5E is a functional block diagram of a cellular phone.

Referring now to FIG. 5E, the teachings of the disclosure can be implemented in memory of a cellular phone 458. The cellular phone 458 includes a phone control module 460, a power supply 462, memory 464, a storage device 466, and a cellular network interface 467. The cellular phone 458 may include a WLAN interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WLAN interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WLAN interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 5F, the teachings of the disclosure can be implemented in memory of a set top box 478. The set top box 478 includes a set top control module 480, a display 481, a power supply 482, memory 483, a storage device 484, and a WLAN interface 485 and associated antenna 486.

The set top control module 480 may receive input signals from the WLAN interface 485 and an external interface 487, which can send and receive information via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the WLAN interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 5G:
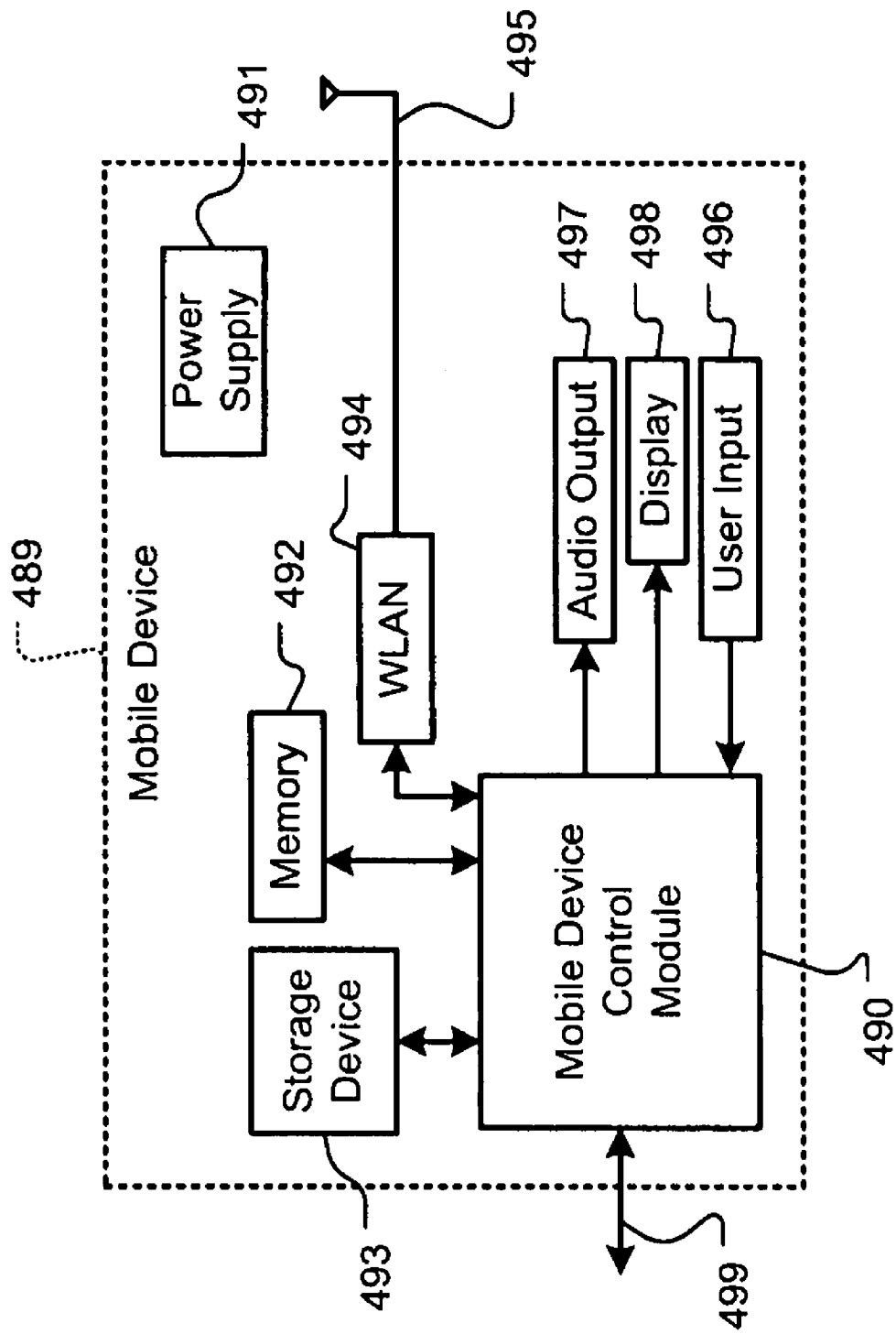
FIG. 5G is a functional block diagram of a mobile device.

Referring now to FIG. 5G, the teachings of the disclosure can be implemented in a memory of a mobile device 489. The mobile device 489 may include a mobile device control module 490, a power supply 491, memory 492, a storage device 493, a WLAN interface 494 and associated antenna 495, and an external interface 499.

The mobile device control module 490 may receive input signals from the WLAN interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console or other mobile computing device.

As can be appreciated, the density of the memory cells in pages of the same block may have the same density. Alternately, the density of memory cells in pages of the same block may vary. Likewise, the page length of pages in the same block may be the same and/or different.

Those skilled in the art can now appreciate from the foregoing description that the broad teachings of the disclosure can be implemented as a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A memory controller comprising:
   a page configure module configured to:
      communicate with a memory array comprising B memory blocks, each of the B memory blocks including P pages,
      selectively configure memory cells in the P pages of each of the B memory blocks to store from 1 to T bits per cell, and
      generate generates a memory map based on the configuration, where B, P, and T are integers greater than 1;
   at least one of a write module configured to selectively write data to the memory array based on the memory map, or
   a read module configured to selectively read data from the memory array based on the memory map; and
   a memory testing module configured to determine an error rate of the memory cells in at least one of the P pages,
   wherein the page configure module is configured to determine the number of bits stored by at least one of the P pages based on the error rate.

2. The memory controller of claim 1,
   wherein the memory cells in at least one of the P pages of one of the B memory blocks are configured to store a first number of bits, and the memory cells in at least one of the P pages of another of the B memory blocks are configured to store a second number of bits, and
   wherein the first number and the second number are stored in the memory map, and the first number is different from the second number.

3. The memory controller of claim 2,
   wherein the memory array is configured to include a first portion including at least one of the B memory blocks, wherein the memory cells associated with the P pages in the at least one of the B memory blocks are configured to store one bit, wherein the memory array is configured to include a second portion including others of the B memory blocks, and wherein the memory cells associated with the P pages in the others of the B memory blocks are configured to store more than one bit.

4. The memory controller of claim 3, wherein the first portion is configured to store a boot code.

5. The memory controller of claim 3, wherein the first portion is configured to store stores configuration data for configuring the second portion.

6. The memory controller of claim 1, wherein the memory map is configured to store stores starting and ending locations of memory cells for each of the P pages.

7. The memory controller of claim 1, wherein the page configure module is configured to select selects a number of the memory cells for a respective one of the P pages based on the number of bits stored by the memory cells in the respective one of the P pages.

8. The memory controller of claim 1, wherein the memory map is configured to store stores starting and ending locations of memory cells for data portions and error checking and correcting (ECC) portions of the at least one of the P pages.

9. The memory controller of claim 8, wherein the page configure module is configured to selectively adjusts adjust a first number of the memory cells that store data relative to a second number of the memory cells that store ECC data in at least one of the ECC portions.

10. The memory controller of claim 1, wherein the page configure module is configured to selectively configure the memory cells in at least a second one of the P pages based on a type of data to be stored in the at least second one of the P pages.

11. A memory system comprising:
the memory controller of claim 1; and
the memory array of claim 1.

12. A method for operating a memory controller, the method comprising:
configuring memory cells in P pages of each of B memory blocks to store from 1 to T bits per cell;
generating a memory map based on the configuration, where B, P, and T are integers greater than 1;
at least one of
selectively writing data to a memory array based on the memory map, or
selectively reading data from the memory array based on the memory map;
selectively adjusting a number of bits stored in at least one of the memory cells of at least one of the P pages;
determining an error rate of the memory cells in the at least one of the P pages; and
determining the number of bits based on the error rate.

13. The method of claim 12, further comprising:
storing a first number of bits in the memory cells in at least one of the P pages of one of the B memory blocks;
storing a second number of bits in the memory cells in at least one of the P pages of another of the B memory blocks; and
storing the first number and the second number in the memory map, wherein the first number is different from the second number.

14. The method of claim 13, further comprising:
configuring the memory cells associated with the P pages in at least one of B memory blocks in a first portion of the memory array to store one bit; and
configuring the memory cells associate with the P pages in a second portion of the memory array in others of the B memory blocks to store more than one bit.

15. The method of claim 14, further comprising storing a boot code in the first portion.

16. The method of claim 14, further comprising storing configuration data for configuring the second portion in the first portion.

17. The method of claim 12, further comprising storing starting and ending locations of memory cells for each of the P pages in the memory map.

18. The method of claim 12, further comprising selecting a number of the memory cells for a respective one of the P pages based on the number of bits stored by the memory cells in the respective one of the P pages.

19. The method of claim 12, further comprising storing starting and ending locations of memory cells for data portions and error checking and correcting (ECC) portions of the at least one of the P pages in the memory map.

20. The method of claim 19, further comprising selectively adjusting a number of the memory cells that store data relative to a number of the memory cells that store ECC data in at least one of the ECC portions.

21. The method of claim 12, further comprising selectively configuring the memory cells in at least one of the P pages based on a type of data to be stored in the at least one of the P pages.

22. A memory controller, comprising:
page configure means for
communicating with memory means for storing data, the memory means comprising B memory blocks, each of the B memory blocks including P pages,
configuring memory cells in the P pages of each of the B memory blocks to store from 1 to T bits per cell, and
generating a memory map based on the configuration, where B, P, and T are integers greater than 1;
at least one of
writing means for selectively writing data to a memory array based on the memory map, or
reading means for selectively reading data from the memory means based on the memory map; and
memory testing means for determining an error rate of the memory cells in the at least one of the P pages,
wherein the page configure means is configured to determine the number of bits stored by at least one of the P pages based on the error rate.

23. The memory controller of claim 22,
wherein the memory cells in at least one of the P pages of one of the B memory blocks are configured to store a first number of bits and the memory cells in at least one of the P pages of another of the B memory blocks are configured to store a second number of bits, and
wherein the first number and the second number are different and stored in the memory map.

24. The memory controller of claim 23,
wherein the memory means is configured to include a first portion including at least one of the B memory blocks,
wherein the memory cells associated with the P pages in the at least one of the B memory blocks are configured to store one bit,
wherein the memory means is configured to include a second portion including others of the B memory blocks, and wherein the memory cells associated with the P pages in the others of the B memory blocks are configured to store more than one bit.

25. The memory controller of claim 24, wherein the first portion is configured to store a boot code.

26. The memory controller of claim 24, wherein the first portion is configured to store configuration data for configuring the second portion.

27. The memory controller of claim 22, wherein the memory map is configured to store starting and ending locations of memory cells for each of the P pages.

28. The memory controller of claim 22, wherein the page configure means is configured to select a number of the memory cells for a respective one of the P pages based on the number of bits stored by the memory cells in the respective one of the P pages.

29. The memory controller of claim 22, wherein the memory map is configured to store starting and ending locations of memory cells for data portions and error checking and correcting (ECC) portions of the at least one of the P pages.

30. The memory controller of claim 29, wherein the page configure means is configured to selectively adjust a number of the memory cells that store data relative to a number of the memory cells that store ECC data in at least one of the ECC portions.

31. The memory controller of claim 22, wherein the page configure means is configured to selectively configure the memory cells in at least a second one of the P pages based on a type of data to be stored in the at least second one of the P pages.

32. A memory system comprising:
the memory controller of claim 22; and
the memory array of claim 22.

33. A nonvolatile (NV) memory controller, comprising:
a page configure module configured to
communicate with a NV memory array comprising B memory blocks, each of the B memory blocks comprising P pages, each of the P pages including a plurality of memory cells,
selectively adjust a number of memory cells associated with at least one of the P pages, and
generate a memory map based on the selective adjustment of the number of memory cells associated with the at least one of the P pages;
a data module configured to process data with respect to the NV memory array based on the memory map,
wherein the page configure module is configured to selectively adjust a number of bits stored in at least one of the plurality of memory cells of at least one of the P pages; and
a memory testing module configured to determine an error rate of the memory cells in the at least one of the P pages, wherein the page configure module is configured to determine the number of bits based on the error rate.

34. The NV memory controller of claim 33, wherein the memory map is configured to store starting and ending points of memory cells for each of the P pages.

35. The NV memory controller of claim 33, wherein the page configure module is configured to selectively adjust a number of the P pages.

36. The NV memory controller of claim 33, wherein the page configure module is configured to selectively adjust a number of memory cells that store data relative to a number of memory cells that store error checking and correcting (ECC) data in at least one of the P pages.

37. The NV memory controller of claim 36, wherein the memory map is configured to store starting and ending points of memory cells for data portions and ECC portions of the at least one of the P pages.

38. The NV memory controller of claim 33, further comprising a type determining module that is configured to (i) determine a memory type of the NV memory array and (ii) generate the memory map based on the memory type.

39. The NV memory controller of claim 33, wherein the page configure module is configured to selectively configure a number of memory cells in at least one of the P pages based on a type of data to be stored in the at least one of the P pages.

40. A NV memory system comprising:
the NV memory controller of claim 33; and
the memory array of claim 33.

41. The NV memory controller of claim 33, wherein the page configure module is configured to (i) selectively set a first number of bits per memory cell in a data portion of at least one of the P pages and (ii) selectively set a second number of bits per memory cell in an overhead portion of the at least one of the P pages.

42. The NV memory controller of claim 41, wherein the first number is different from the second number.

43. The NV memory controller of claim 33, wherein the data module comprises at least one of:
a write module configured to selectively write data to the NV memory array based on the memory map; or
a read module configured to selectively read data from the NV memory array based on the memory map.

44. A method for operating a nonvolatile (NV) memory controller, the method comprising:
selectively adjusting a number of memory cells associated with at least one of P pages of a NV memory array, the NV memory comprising B memory blocks, each of the B memory blocks comprising P pages;
generating a memory map based on adjusting the number of memory cells;
processing data with respect to the NV memory array based on the memory map;
selectively adjusting a number of bits stored in at least one of the memory cells of at least one of the P pages;
determining an error rate of the memory cells in the at least one of the P pages;
and determining the number of bits based on the error rate.

45. The method of claim 44, further comprising storing starting and ending points of memory cells for each of the P pages in the memory map.

46. The method of claim 44, further comprising:
selectively adjusting a number of memory cells that store data relative to a number of memory cells that store error checking and correcting (ECC) data in at least one of the P pages.

47. The method of claim 46, further comprising storing starting and ending points of memory cells for data portions and ECC portions of the at least one of the P pages in the memory map.

48. The method of claim 44, further comprising:
determining a memory type of the NV memory array; and
generating the memory map based on the memory type.

49. The method of claim 44, further comprising selectively configuring a number of memory cells in at least one of the P pages based on a type of data to be stored in the at least one of the P pages.

50. The method of claim 44, further comprising:
   selectively setting a first number of bits per memory cell in a data portion of at least one of the P pages; and
   selectively setting a second number of bits per memory cell in an overhead portion of the at least one of the P pages.

51. The method of claim 50, wherein the first number is different from the second number.

52. The method of claim 44, further comprising at least one of:
   selectively writing data to the NV memory array based on the memory map; or
   selectively reading data from the NV memory array based on the memory map.

* * * * *